(12) United States Patent
Becker et al.

(10) Patent No.: US 11,340,058 B2
(45) Date of Patent: May 24, 2022

(54) REAL-TIME SCAN POINT HOMOGENIZATION FOR TERRESTRIAL LASER SCANNER

(71) Applicant: FARO Technologies, Inc., Lake Mary, FL (US)

(72) Inventors: Julian Becker, Korntal-Münchingen (DE); Daniel Pompe, Leonberg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

(21) Appl. No.: 16/914,712

(22) Filed: Jun. 29, 2020

(65) Prior Publication Data

US 2021/0010799 A1   Jan. 14, 2021

Related U.S. Application Data

(60) Provisional application No. 62/873,499, filed on Jul. 12, 2019.

(51) Int. Cl.
| | | |
|---|---|---|
| *G01B 11/00* | (2006.01) | |
| *G01B 9/02015* | (2022.01) | |
| *G01B 9/0209* | (2022.01) | |
| *G01B 9/02* | (2022.01) | |

(52) U.S. Cl.
CPC .......... *G01B 11/002* (2013.01); *G01B 9/0209* (2013.01); *G01B 9/02015* (2013.01); *G01B 9/02041* (2013.01)

(58) Field of Classification Search
CPC .................. G01B 11/002; G01B 9/02015; G01B 9/0209; G01B 9/02041; G01S 17/86; G01S 7/4817; G01S 17/89; G01S 17/42; G01C 15/002
See application file for complete search history.

(56) References Cited

U.S. PATENT DOCUMENTS

| 8,705,012 B2 | 4/2014 | Greiner et al. |
| 9,074,878 B2 | 7/2015 | Steffey et al. |
| 9,279,662 B2 | 3/2016 | Steffey et al. |

(Continued)

OTHER PUBLICATIONS

Search Report issued in European Patent Application No. 20184428.9-1206 dated Nov. 20, 2020; 11 pages.

(Continued)

*Primary Examiner* — Jonathan M Hansen
(74) *Attorney, Agent, or Firm* — Cantor Colburn LLP (57) ABSTRACT

According to one embodiment, a three-dimensional (3D) measuring device is provided. The 3D measuring device includes a processor system that is configured to generate a point cloud representing multiple surfaces. The point cloud includes multiple scan points. Generating the point cloud includes receiving spherical coordinates for a scan point, the spherical coordinates comprising a distance (r), a polar angle (θ), and an azimuth angle (φ). Generating the point cloud further includes homogenizing a scan point density of the surfaces by filtering the scan points. The homogenizing includes computing a value (p) for the scan point based on the spherical coordinates. Based on the value exceeding a predetermined threshold, storing the scan point as part of the point cloud, and based on the value not exceeding the predetermined threshold, discarding the scan point.

17 Claims, 8 Drawing Sheets

(56) References Cited

U.S. PATENT DOCUMENTS

| | | |
|---|---|---|
| 9,378,554 B2 * | 6/2016 | Chang .................... G01S 17/89 |
| 9,762,883 B2 | 9/2017 | Vollrath et al. |
| 10,116,920 B2 | 10/2018 | Vollrath et al. |
| 10,132,611 B2 | 11/2018 | Steffey et al. |
| 10,222,476 B2 | 3/2019 | Herbst et al. |
| 2014/0300906 A1 | 10/2014 | Becker et al. |
| 2016/0153773 A1 * | 6/2016 | Bartmann ............... G01S 17/86 356/607 |
| 2018/0122091 A1 | 5/2018 | Herbst |
| 2019/0257642 A1 | 8/2019 | Hillebrand |
| 2019/0339391 A1 | 11/2019 | Santos et al. |
| 2019/0353478 A1 * | 11/2019 | Deng ....................... G01P 3/68 |
| 2020/0018869 A1 | 1/2020 | Ossig et al. |
| 2020/0033500 A1 | 1/2020 | Trollmann et al. |

OTHER PUBLICATIONS

Xu Xiaobin, et al., "Plane Segmentation and Fitting Method of Point Clouds Based on Improved Density Clustering Algorithm for Laser Radar" Infrared Physics and Technology, vol. 96, pp. 133-140, XP085577497.

* cited by examiner

REAL-TIME SCAN POINT HOMOGENIZATION FOR TERRESTRIAL LASER SCANNER

BACKGROUND

The subject matter disclosed herein relates to use of a 3D laser scanner time-of-flight (TOF) coordinate measurement device. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Generating an image requires at least three values for each data point. These three values may include the distance and two angles, or may be transformed values, such as the x, y, z coordinates. In an embodiment, an image is also based on a fourth gray-scale value, which is a value related to irradiance of scattered light returning to the scanner.

Most TOF scanners direct the beam of light within the measurement volume by steering the light with a beam steering mechanism. The beam steering mechanism includes a first motor that steers the beam of light about a first axis by a first angle that is measured by a first angular encoder (or other angle transducer). The beam steering mechanism also includes a second motor that steers the beam of light about a second axis by a second angle that is measured by a second angular encoder (or other angle transducer).

Many contemporary laser scanners include a camera mounted on the laser scanner for gathering camera digital images of the environment and for presenting the camera digital images to an operator of the laser scanner. By viewing the camera images, the operator of the scanner can determine the field of view of the measured volume and adjust settings on the laser scanner to measure over a larger or smaller region of space. In addition, the camera digital images may be transmitted to a processor to add color to the data captured by the scanner. To generate a color scanner image, at least three positional coordinates (such as x, y, z) and three color values (such as red, green, blue "RGB") are collected for each data point.

Technical challenges for existing 3D scanners include that of a variable scan-point density in point clouds that are captured, particularly when the scan point density is not a true representation of the physical reality in the environment being captured, or when the variation in the scan point density is introduced by the measurement process/apparatus. Here, scan-point density represents a number of points captured by a scanner per unit area/volume. Such variance in the scan-point density can lead to incorrect registration of the point clouds, which in turn can cause visual artifacts and other disturbances when displaying/rendering the point clouds. The density variations can cause visual artifacts and rendering-issues even prior to registration.

Accordingly, while existing 3D scanners are suitable for their intended purposes, what is needed is a 3D scanner having certain features of embodiments of the present invention.

BRIEF DESCRIPTION

According to one embodiment, a three-dimensional (3D) measuring device is provided. The 3D measuring device includes a processor system that is configured to generate a point cloud representing multiple surfaces. The point cloud includes multiple scan points. Generating the point cloud includes receiving spherical coordinates for a scan point, the spherical coordinates comprising a distance (r), a polar angle ($\theta$), and an azimuth angle ($\varphi$). Generating the point cloud further includes homogenizing a scan point density of the surfaces by filtering the scan points. The homogenizing includes computing a value (p) for the scan point based on the spherical coordinates. Based on the value exceeding a predetermined threshold, the scan point is stored as part of the point cloud, and based on the value not exceeding the predetermined threshold, the scan point is discarded.

According to one or more embodiments, a method is described for generating, by a three-dimensional (3D) scanner device, a point cloud representing multiple surfaces from an environment. The point cloud includes multiple scan points. The method includes receiving spherical coordinates for a scan point, the spherical coordinates comprising a distance (r), a polar angle ($\theta$), and an azimuth angle ($\varphi$). The method further includes homogenizing a scan point density of the surfaces by filtering the scan points. The homogenizing includes computing a value (p) for the scan point based on the spherical coordinates. Further, based on the value exceeding a predetermined threshold, the scan point is stored as part of the point cloud, and based on the value not exceeding the predetermined threshold, the scan point is discarded.

According to one or more embodiments, a computer program product includes a memory storage device that has computer executable instructions stored therein. The computer executable instructions when executed by a processor cause the processor to perform a method for generating, by a three-dimensional (3D) scanner device, a point cloud representing multiple surfaces from an environment. The point cloud includes multiple scan points. The method includes receiving spherical coordinates for a scan point, the spherical coordinates comprising a distance (r), a polar angle ($\theta$), and an azimuth angle ($\varphi$). The method further includes homogenizing a scan point density of the surfaces by filtering the scan points. The homogenizing includes computing a value (p) for the scan point based on the spherical coordinates. Further, based on the value exceeding a predetermined threshold, the scan point is stored as part of the point cloud, and based on the value not exceeding the predetermined threshold, the scan point is discarded.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a 3D measuring device having a 3D scanner. Embodiments of the invention provide advantages acquiring three-dimensional (3D) coordinates of an area of the environment with real-time sub-sampling of a stream of scan point data as the 3D scanner is capturing a point cloud. Embodiments of the invention provide advantages in acquiring 3D such point clouds using a constant amount of memory, and a constant computational complexity per scan point. Further, the sub-sampling is performed to obtain a homogenized scan point density in the point clouds that are captured. For example, the sub-sampling performed can result in a predetermined density of scan points on surfaces that are orthogonal to the direction of incidence of a measurement beam that is transmitted by the 3D scanner. In one or more examples, the density of scan points can be limited/bounded to a predetermined density because of finite angular resolution. Further, the incidence of the measurement beam can also limit the predetermined density up to a certain distance, which is dependent on the angular sampling step-size, as well as a polar measurement angle (theta).

Accordingly, the technical solutions described herein address the technical challenge of variable scan point densities in the captured point clouds. It is generally desired that in the captured point clouds two surfaces of substantially equal size include substantially equal number of scan points. In other words, the technical challenge can be expressed as: on a given surface that is scanned by the 3D scanner, the number of scan points be independent of a polar measurement angle (theta) and the measurement distance (r) between the surface and the 3D scanner.

Figure 1:
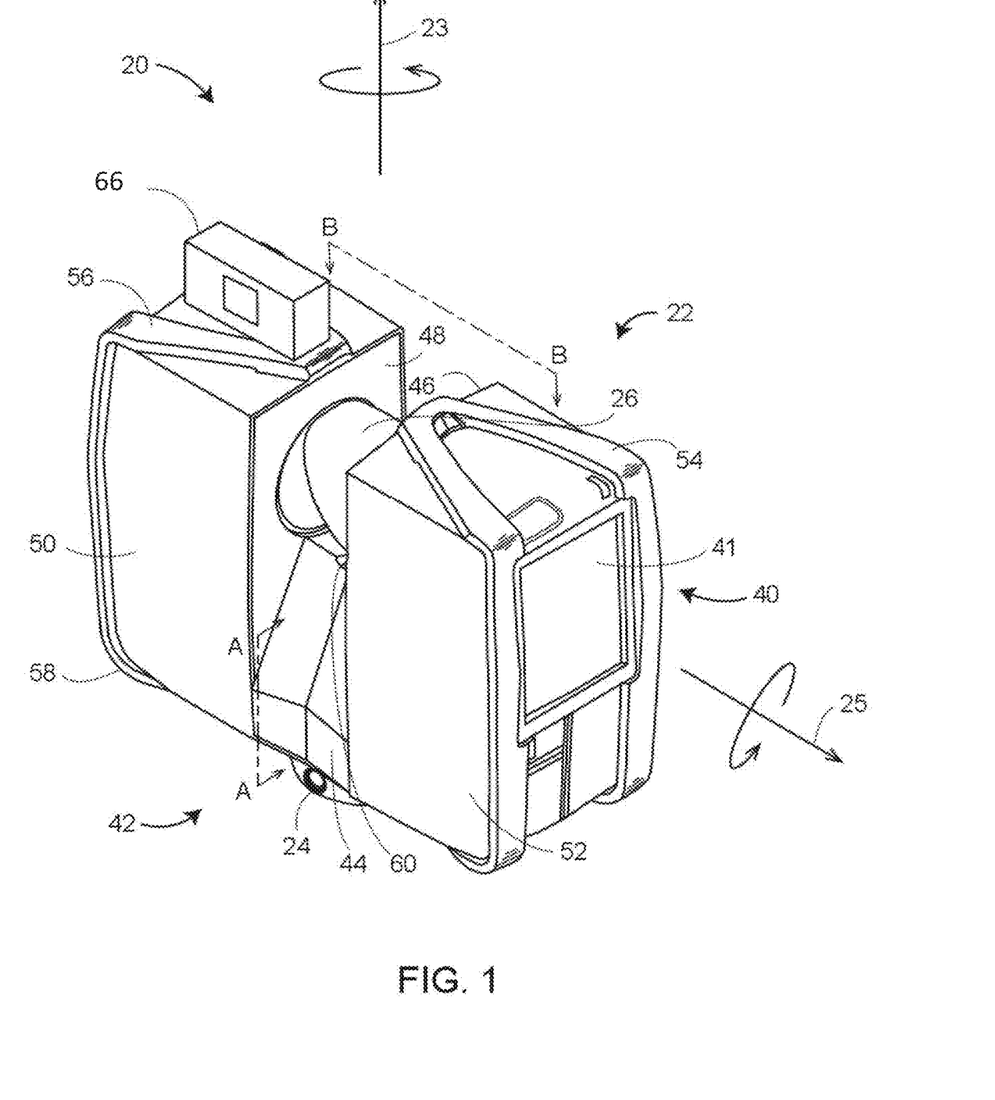
FIG. 1 is a perspective view of a laser scanner in accordance with an embodiment of the invention.
Figure 2:
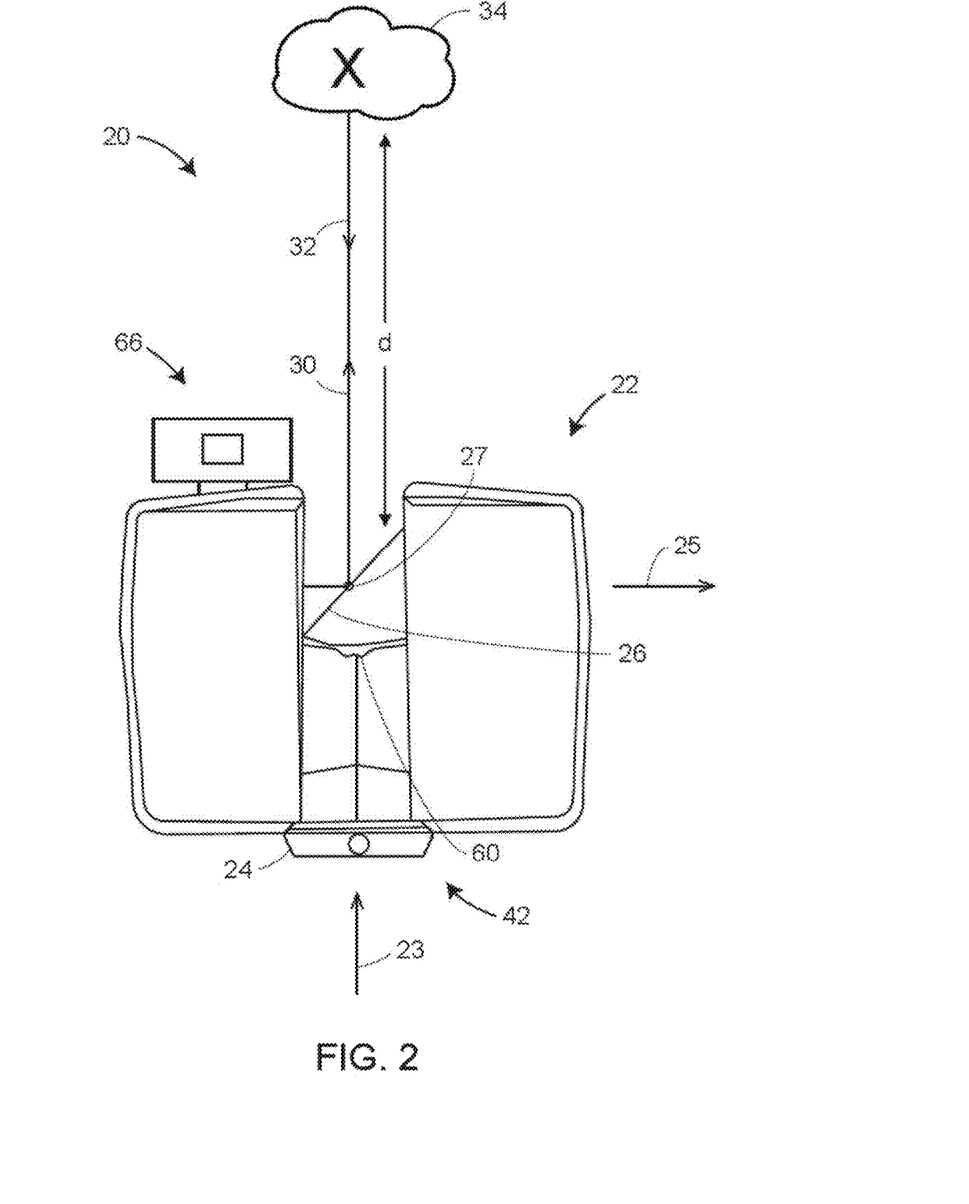
FIG. 2 is a side view of the laser scanner illustrating a method of measurement according to an embodiment.
Figure 3:
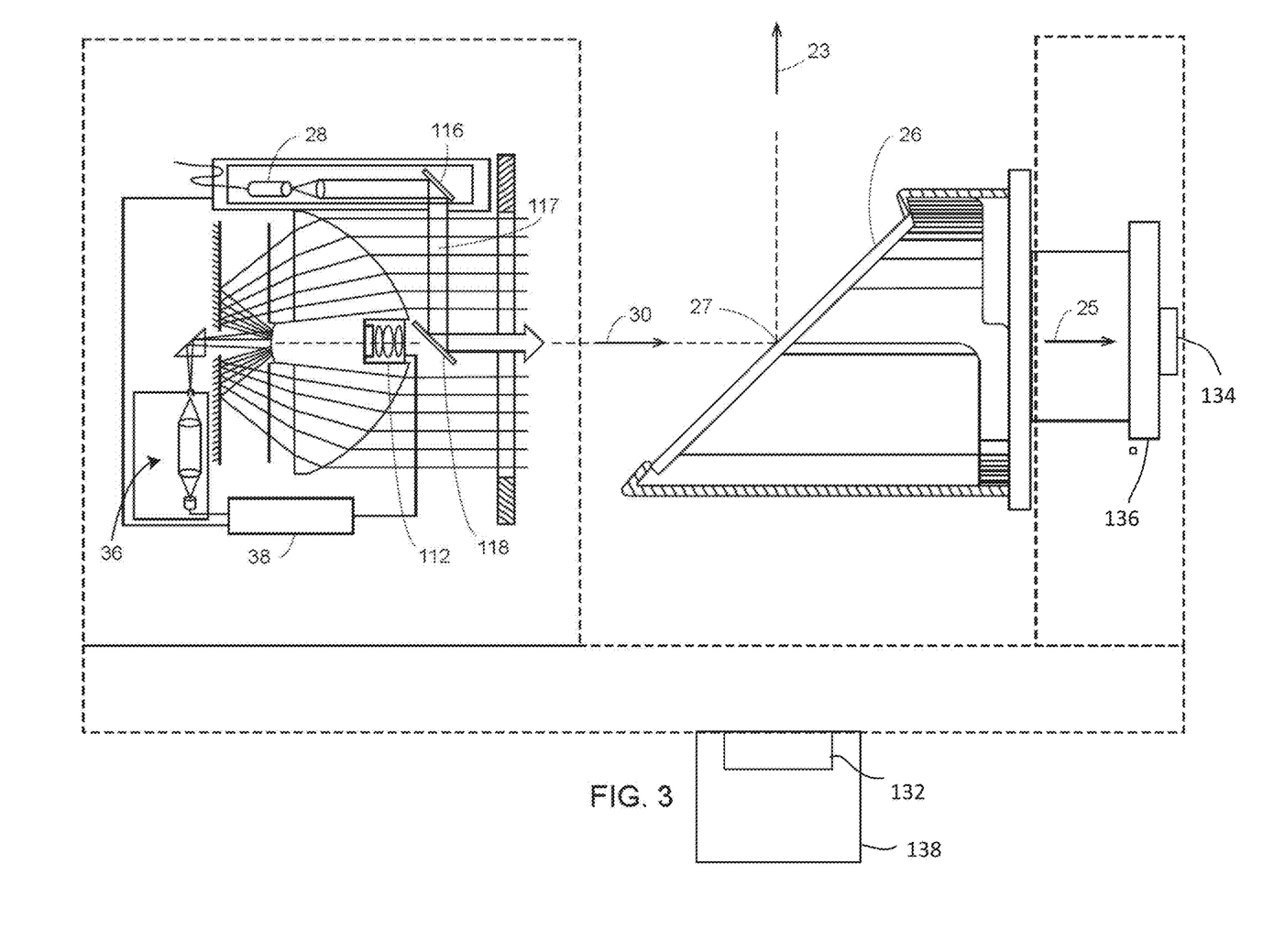
FIG. 3 is a schematic illustration of the optical, mechanical, and electrical components of the laser scanner according to an embodiment.

Referring now to FIGS. 1-3, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 132.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 112 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 4:
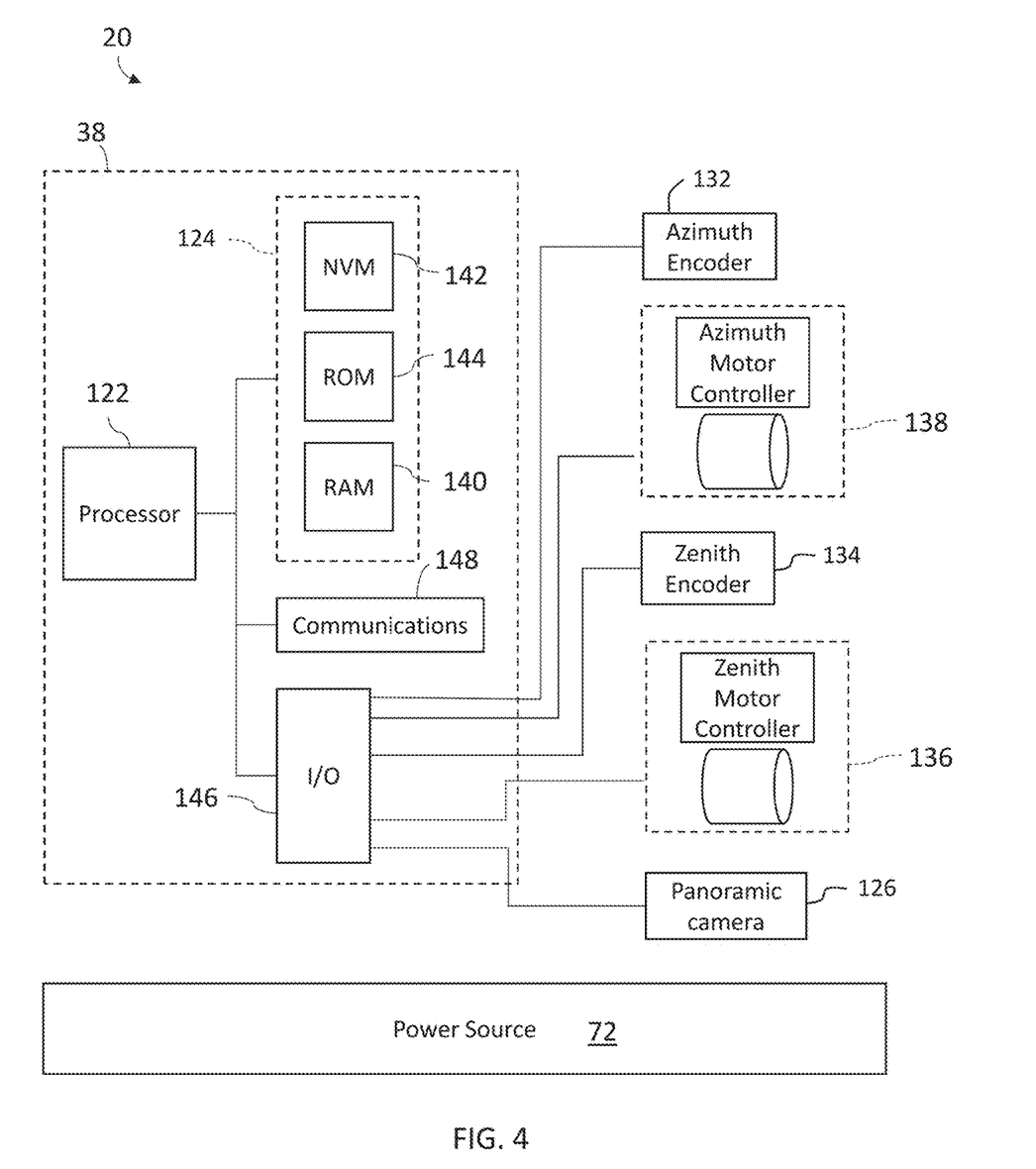
FIG. 4 illustrates a schematic illustration of the laser scanner of FIG. 1 according to an embodiment.

Referring now to FIG. 4 with continuing reference to FIGS. 1-3, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 126, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 126, and auxiliary device 66, and is given certain instructions for the purpose of generating a 3D point cloud of a scanned environment. Controller 38 provides operating signals to the light source 28, light receiver 36, panoramic camera 126, zenith motor 136, azimuth motor 138, and the auxiliary device 66. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes), an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(^) Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 148 provides an interface that allows wireless or wired communication with one or more external devices or networks, such as the LAN discussed above.

Controller 38 includes operation control methods embodied in application code described herein. These methods are embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 5:
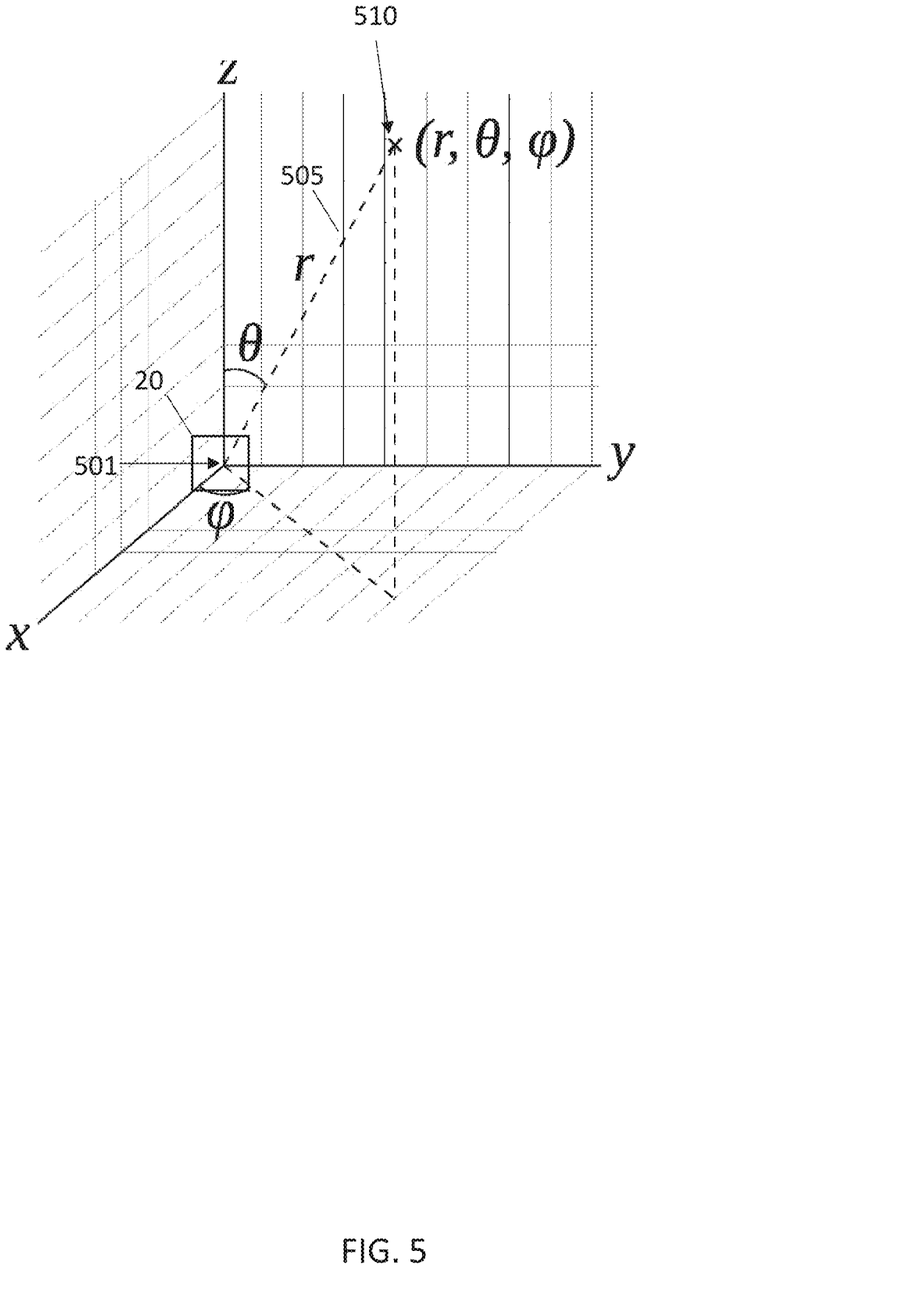
FIG. 5 depicts geometry of a spherical coordinate system as used by a 3D scanner according to one or more embodiments.

FIG. 5 depicts geometry of a spherical coordinate system as used by a 3D scanner according to one or more embodiments. The 3D scanner 20 is scanning from a point 501 to capture scan points 510 in the environment. The 3D scanner 20 produces a set of distance measurements in a spherical coordinate system, where scan points for samples are captured at regular predetermined angular intervals of both, the polar angle ($\theta$) and the azimuth angle ($\varphi$). Consider, in the examples described herein, that $\theta=0$ coincides with the z-axis 23 in a Cartesian coordinate system; however, it is understood that the mapping of the spherical coordinate system with the Cartesian coordinate system can be different in other examples. In one or more examples of the 3D scanner 20, such as in the FARO® FOCUS series of scanners manufactured by FARO Technologies, Inc of Lake Mary, Fla. USA, the laser beam is deflected by the mirror 26 to determine the polar angle and pan axis to determine the azimuth angle.

A point 510 in the spherical coordinate system can be represented by three-values—a distance (r) from the 3D scanner 20 in direction of the polar angle, the polar angle ($\theta$), and the azimuth angle ($\varphi$). In one or more examples, the scan points are captured at a regular interval of $\theta$ for each $\varphi$. Consider, for example, that for each $\varphi=0$, $1*2\pi/N$, $2*2\pi/N$, . . . , $$\left(\frac{N}{2}-1\right)*2\pi/N,$$

the 3D scanner 20 samples at $\theta=0$, $1*2\pi/N$, $2*2\pi/N$, . . . , $(N-1)*2\pi/N$, where N represents a number of samples for one mirror revolution.

Figure 6:
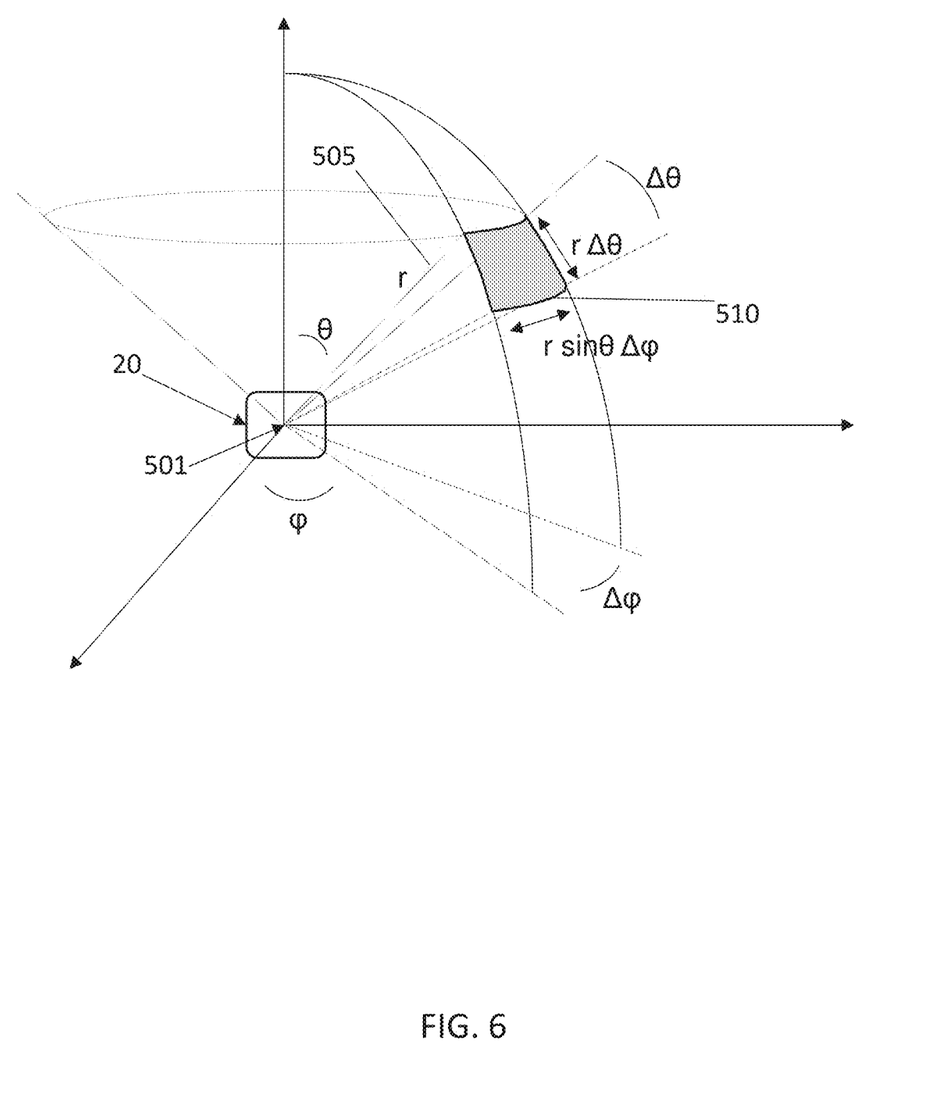
FIG. 6 depicts a visualization of the measurements according to one or more embodiments.

FIG. 6 depicts a visualization of the measurements according to one or more embodiments. It is understood that the depiction is just an example and that in other example scenarios other depictions can be possible. A length of a line segment 505 swept out by the 3D scanner 20 in the θ direction at a distance r is rΔθ. The corresponding line segment 510 swept out in the φ direction is r sin θΔφ. Accordingly, the area of the surface/plane for which the 3D scanner 20 captures scanned points is $r^2 \sin \theta \Delta\theta \Delta\varphi$. However, as described earlier, a technical challenge with the point clouds captured in this manner is that the scan point density for the surface can vary from another surface with the same area. The scan point density is a number of scan points captured per unit area of the surface that is scanned.

To address the technical challenge, in one or more embodiments, the scan points that are captured by the 3D scanner 20 are sampled based on a predetermined scan point density. The collected scan points for a surface are selected to be stored (or not stored) based on this predetermined scan point density. Accordingly, only a particular number of scan points are stored so that the scan point density of the surface being captured is substantially equal to the predetermined scan point density. In one or more examples, the sampling is performed at real time as the scan points are being captured.

To determine whether to store the captured scan point 510, a pseudo-random number that is generated at real time. A probability to determine whether to store the scan point is then computed based on one or more parameters associated with the scan point 510. The random number generator is used to produce samples of a random variable which behaves in accordance with a given probability distribution (e.g. Bernoulli distribution). Based on the desired surface scan point density, and based on scan point measurements/parameters, parameters for the probability distribution are calculated (without any randomness). For a Bernoulli distribution, the only parameter is p, which represents the probability of keeping the point. Scan points with the probability value above (or below) a predetermined threshold are stored and others are discarded, in one or more examples. In one or more examples, the decision to keep (store) or discard (drop/not store) is determined by the realization of a random variable P. The random variable P is associated with the probability distribution (e.g. a Bernoulli distribution) which is parametrized based on one or more parameters or measurements associated with the scan point 510. The parameters or measurements can include the coordinates associated with the scan point, the scan-point's reflectivity, brightness, intensity, and other such attributes.

Alternatively, or in addition, in one or more examples, the decision to keep or discard the scan point 510 is made prior to sampling of any random variable. Instead, the decision is based on a comparison of a metric that is associated with one or more parameters or measurements associated with the scan point 510. Accordingly, in one embodiment, the decision to keep/drop is associated with angle θ, distance r, and a prescribed constant parameter $R_0$, yielding a metric of $(r^2/R_0^2) \sin \theta$. This metric, which is not a probability value (because it can be larger than 1) is then compared against a threshold value to determine if the point is to be kept discarded.

Figure 7:
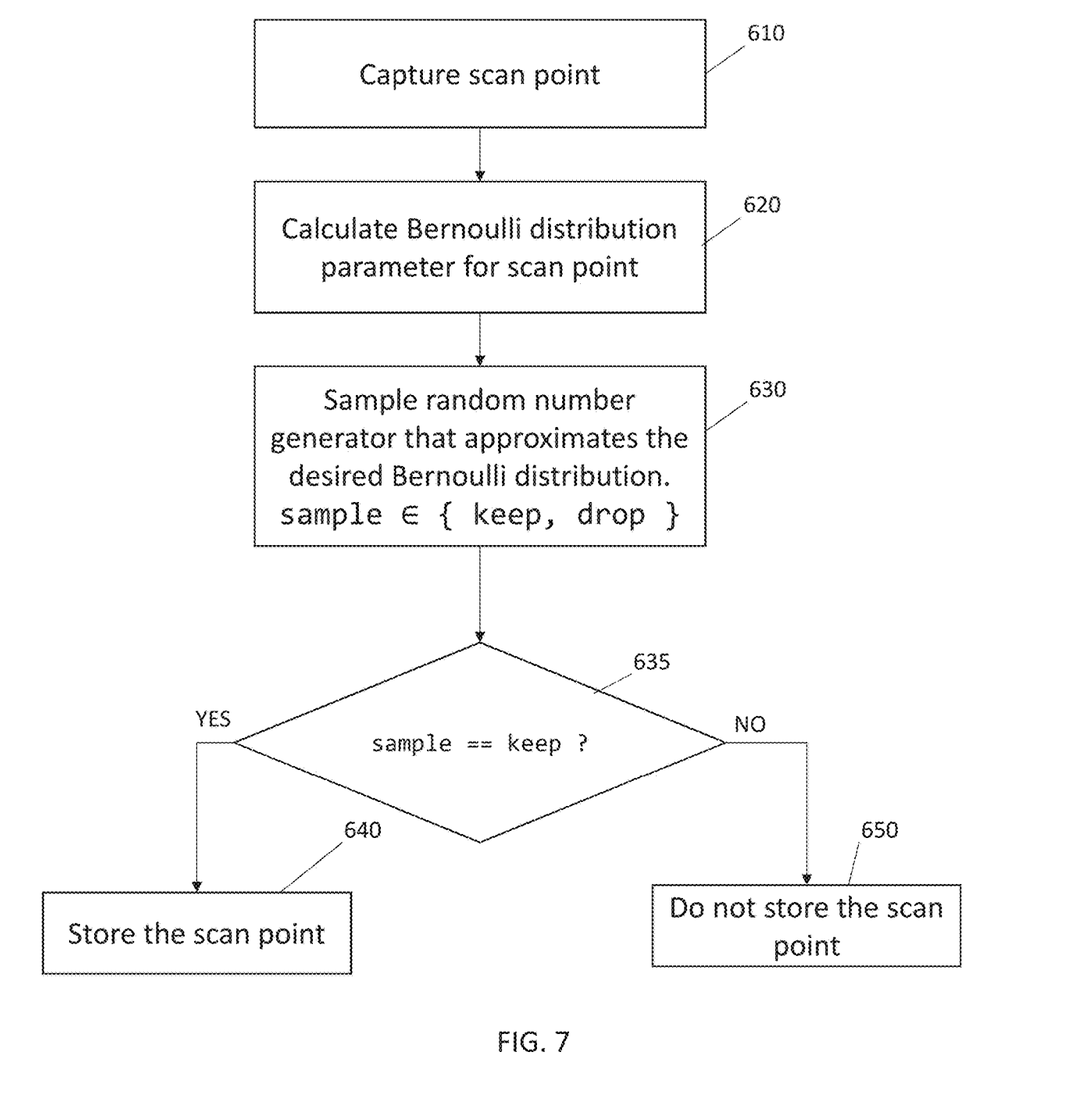
FIG. 7 depicts a flowchart of an example method for sampling the captured scan points according to one or more embodiments.

FIG. 7 depicts a flowchart of an example method for sampling the captured scan points according to one or more embodiments. The method is performed on each scan point that is captured by the 3D scanner 20. The method includes capturing the scan point 510, at block 610.

The method further includes computing a pseudo-random number X for the scan point 510, at block 620. The pseudo-random number X can be generated using known techniques (e.g. Mersenne-Twister, linear congruential generator engine, etc.) for generating a uniformly distributed random variable over a given range of numbers (integers, floating point numbers etc.). It is understood that the names/symbols used for representing one or more parameters in the description herein are exemplary, and that other names/symbols can be used in other examples.

The pseudo-random number is computed as a probability value of whether to keep or drop the captured scan point. For example, if r≤R0:

Probability $(X=\text{keep})=p=(r/R0)^2*\sin(\theta)$; and

Probability $(X=\text{drop})=1-p$.

Here, R0 is a normalization constant, which can be user defined/predefined value based on desired scan point density. If r>R0, different calculations can be performed. For example, in this case, p=1 is set, so that scan points are stored even if they do not meet the intended scan point density. Alternatively, p=0 is set, so that the scan points are discarded if they do not meet the desired point density.

The pseudo random numbers X that are generated using uniform distribution are sampled, at 630. The sampling of the Bernoulli-distributed random variable X will give either "keep" or "drop" (Bernoulli is binary and will not give any other values). If the sampling results in "keep" then the scan point 510 is stored, if it results in "drop" then the scan point 510 is not stored (discarded). It should be noted that besides Bernoulli distribution, in other examples, other probability distributions can be used with larger discrete or even continuous range of values they produce. For such cases, a predicate function can be defined, for example, f: E→{keep, drop}, where E is the set of values representing the range of the random variable. Accordingly, if the sampled value is from a predetermined set of values (range of values) associated with the pseudo-random number being generated, the scan point is stored (or discarded).

Accordingly, depending on whether the sampled value represents "keep", the captured scan point 510 is stored, at blocks 635 and 640. If the sampled value represents "drop", the scan point 510 is not stored, at blocks 635 and 650.

Figure 8A:
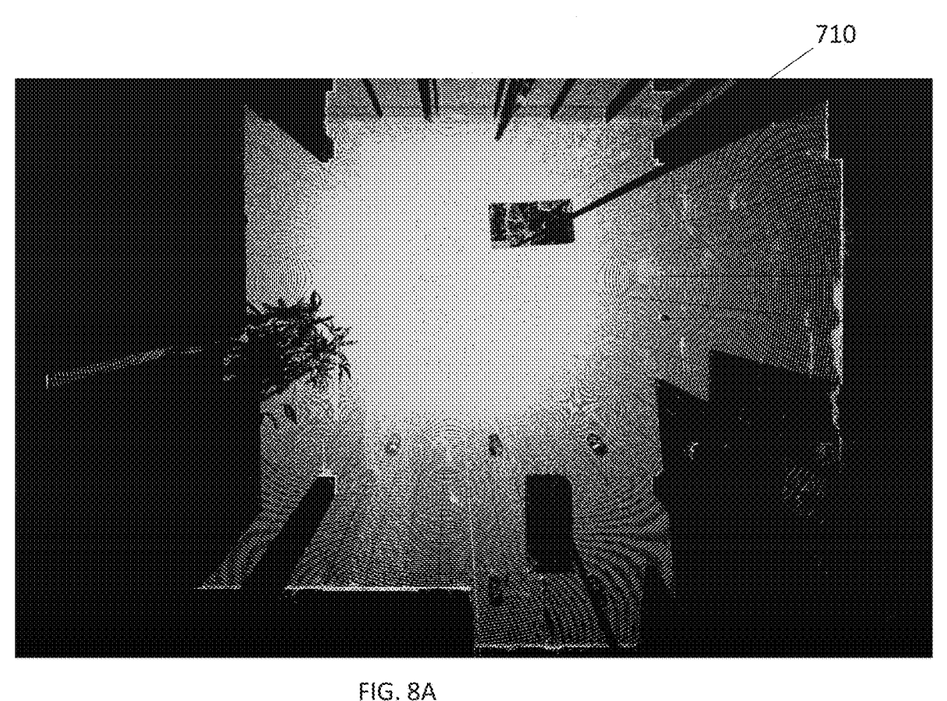
FIG. 8A depicts an unfiltered point cloud that is captured and stored without using a homogenizing sampling scheme such as the above.
Figure 8B:
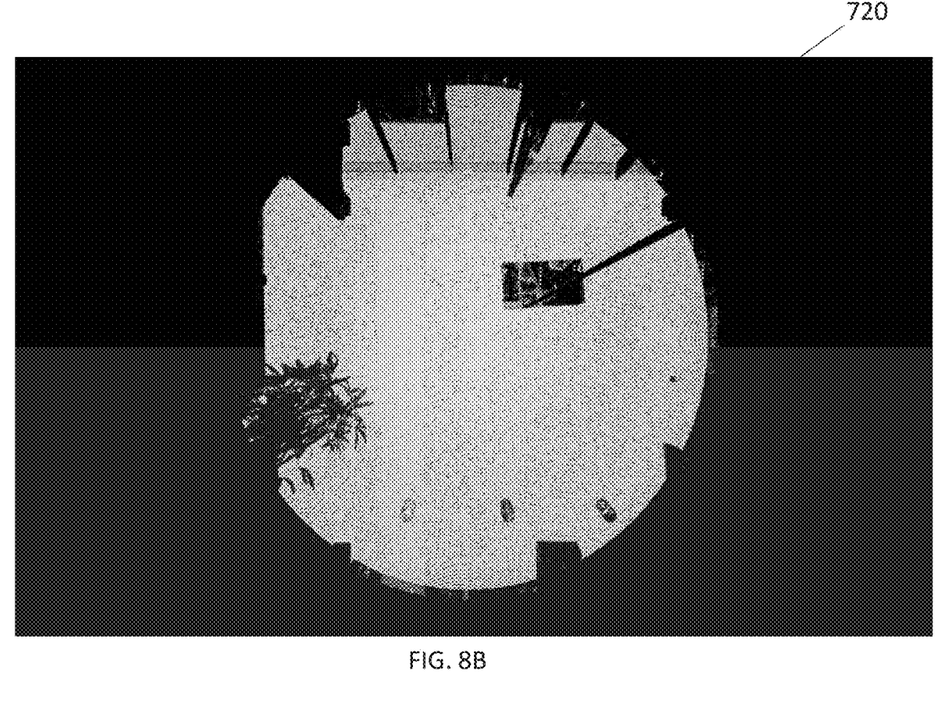
FIG. 8B depicts a filtered point cloud that does use a sampling scheme according to one or more embodiments.

FIG. 8A depicts an unfiltered point cloud 710 that is captured and stored without using a homogenizing sampling scheme such as the above, and a filtered point cloud 720 that does use a sampling scheme. As can be seen, the unfiltered point cloud includes "noisy" data that can be difficult during the registration process, the noisy data being points captured from outside of a spherical volume that the scanner 30. Further, as can be seen, surfaces in the unfiltered point cloud 710 have different scan point density, for example, some surfaces are seen brighter (higher scan point density) compared to other darker surfaces (lower scan point density). In contrast, the filtered point cloud 720 shown in FIG. 8B includes scan points that are homogenized across surfaces, and accordingly, substantially all the surfaces have a similar brightness.

The resulting point cloud that is obtained after storing (keeping) and not storing (dropping) the captured scan points according to the above procedure results in a locally averaged surface point density ρ that is limited by $\rho_{max}$, which can be calculated as:

$$\rho_{max} = \frac{1}{R0^2 * \Delta\varphi * \Delta\theta}$$

Accordingly, the scan point density of a surface is limited by the probability distribution used herein. The scan point density is therefore substantially more homogenized across the various surfaces captured by the 3D scanner 20 than capturing scan points without the techniques herein. There can still be remaining in-homogeneities for surfaces which are inclined against the angle of incidence (i.e. surfaces which deviate from a sphere centered about the gimbal point 27 of the scanner 20. It should be noted that the embodiments described herein describes the sampling being performed at the time the scan points are captured. The same techniques can be used for a collection of scan points that are already captured if, while storing the scan points, the 3D scanner 20 also stores the r, θ, and φ values for each scan point. The sampling in this case can filter the stored data to create a second data set with sampled scan points.

The technical solutions described addresses the technical challenge with 3D scanners that use spherical scanning because when scanning a spherical volume, the scan point density is higher in the middle (near the center) than the edges due to the change in distance, and higher near the zenith. Existing solutions address this technical challenge by scanning the area and then defining a fixed volume box (voxel) and selecting one point within the voxel. The technical solutions described herein provide an improved solution because the amount of memory required at the runtime is lower.

In one or more examples, when further thinning, i.e. a lower scan point density is desired after the point cloud has been captured and stored, the voxel technique can be used offline after the random-distribution probability sampling is used at runtime.

Another technical challenge faced by 3D laser scanners is that of filtering scan points so as to only drop scan points which are at a particular distance where a desired/prescribed scan point density cannot be fulfilled because of the scanner's limited resolution. While such filtering can be performed in an offline manner after the point cloud has been stored, such offline filtering can take a considerable amount of computational resources and time, and typically requires human intervention. Technical solutions are described herein to address such technical challenges. According to one or more embodiments, the number of undesired scan points is reduced by filtering out scan points that are captured at a particular distance/angle where the desired minimal surface scan point density cannot be guaranteed. Accordingly, the number of points that have to be processed in an offline manner is substantially reduced.

As noted earlier, consider the 3D scanner 20 that captures scan points using a spherical coordinate system, where samples are captured at regular angular intervals of both, the polar angle and the azimuth angle. Consider that the angular resolution for the polar angle is Δθ and that the angular resolution for the azimuth angle is Δφ. A predetermined constant RC is computed as:

$$RC = 1/\sqrt{\rho_{min} * \Delta\varphi * \Delta\theta}$$

Here, $\rho_{min}$ is a desired minimum scan point density (number of scan points per unit area) for the point cloud being captured. The scan point filter criterion for a scan point at a distance r and a polar angle θ is as follows:
If $$\left(\frac{r^2}{RC^2}\right) * \sin(\theta) \leq 1,$$

keep the scan point; and
If $$\left(\frac{r^2}{RC^2}\right) * \sin(\theta) > 1,$$

drop the scan point.

While, in the technical features described earlier, the probabilistic filtering was applied to limit the scan point density to a predetermined maximum ($\rho_{max}$), here the scanner imposed angular resolutions are used to provide lower limits on surface scan point density at a given distance and polar angle.

Here, if the angular resolutions Δφ and Δθ are fixed at preconfigured values as the 3D scanner 20 moves the laser beam, the estimated surface scan point density can be calculated as:

$$\rho = \frac{(r/RC)^2 \sin(\theta)}{r^2 \sin(\theta) \Delta\theta \Delta\varphi} = \frac{1}{RC^2 \Delta\theta \Delta\varphi}$$

For a given setting on the 3D laser scanner 20, the step sizes Δφ and Δθ are fixed. For example, for a step size Δθ=Δφ=2π/N, the expected surface density is:

$$\rho = \frac{1}{RC^2 \Delta\theta \Delta\varphi} = \frac{1}{RC^2 \frac{2\pi}{N} \frac{2\pi}{N}} = \left(\frac{N}{2\pi RC}\right)^2$$

As can be seen the resulting scan point density above is a constant. In other words, the surface density is based on a probability, but the expected surface density is a constant having units of points per area. The number of points in a unit area for a given step in Δθ and Δφ is:

$$\rho_{min} r^2 \sin(\theta) \Delta\theta \Delta\varphi = \frac{r^2 \sin(\theta) \Delta\theta \Delta\varphi}{RC^2 \Delta\theta \Delta\varphi} = \frac{r^2}{RC^2} \sin(\theta)$$

For example, suppose the maximum number of points in a unit area for a given step Δθ and Δφ is desired to be less than or equal to 1. It follows that a point will only be included in the final point cloud if r≤RC/√sin(θ). In other words, points that are too far away from the 3D scanner 20 are not included in the final point cloud that is stored. This results in a cleaner looking point cloud when rendered because occasional extraneous far-away points are not included in the point cloud, and hence in the final 3D image.

It should be noted that the filter works under the assumption of perpendicular incidence angle of the laser beam, hence, the actual scan point density (φ can vary from the target minimum scan point density ($\rho_{min}$) on surfaces that are hit in a non-perpendicular manner by the laser beam from the 3D scanner 20.

In the above examples, the desired scan point density can be a user provided value. Alternatively, or in addition, the desired scan point density can be based on other parameters, such as available network bandwidth. For example, if the network bandwidth for the streaming data transport is limited, in which case a threshold for the probability p can be calculated such that the bandwidth necessary for streaming equals (on average) MeasurementRate*SerializedScanPointSize*p. Accordingly, when using the probabilistic distribution, if the keep value is greater than the threshold p, the scan point is streamed, and not streamed otherwise. In one or more examples, the scheme facilitates reacting to streaming-backpressure (e.g. due to changes in available network bandwidth) by changing the value of p dynamically.

The technical solutions described herein can be used to filter scan points at runtime as the scan points are being captured and processed and on a per scan point basis. As can be seen, the filters can be applied on each scan point without additional information about adjacent scan points, such as in a voxel. Therefore, additional post-processing time is not required and the filtering can be performed as the scan points are being captured, prior to the scan points being stored. The computational resources required for the filters are readily available, and the filters are not computationally intensive making them suitable for being used in embedded computing environments. The resulting rendering of the point cloud is visually more appealing because of the filtering applied to outlier scan points, which may be at a further distance than remaining scan points of a surface.

Further, the technical solutions facilitate a substantial reduction in the scan data that can be performed at runtime as the scan points are being captured. The reduction is parameterized by a given surface scan point density, which can be a user configurable value. For 3D laser scanners in which sensors only measure points on surfaces of objects, the technical solutions described herein produce homogenization of the scan point density. The homogenization produced in this manner is an improvement over the homogenization produced using a voxel based technique, which relies on a volume-density.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A three-dimensional (3D) scanner device comprising:
a processor system that is configured to generate a point cloud representing multiple surfaces, the point cloud comprises a plurality of scan points, and wherein generating the point cloud comprises:
receiving spherical coordinates for a scan point, the spherical coordinates comprising a distance (r), a polar angle (θ), and an azimuth angle (φ);
homogenizing a scan point density of the surfaces by filtering the scan points, the homogenizing comprising:
computing a value (p) for the scan point based on the spherical coordinates, wherein the value is a pseudo-random number based on the spherical coordinates;
based on the value of the pseudo-random number exceeding a predetermined threshold, storing the scan point as part of the point cloud; and
based on the value of the pseudo-random number not exceeding the predetermined threshold, discarding the scan point.

2. The three-dimensional scanner device of claim 1, wherein the pseudo-random number is generated based on the spherical coordinates as $p=(r/R0)^2 * \sin(\theta)$, where R0 is a normalization constant.

3. The three-dimensional scanner device of claim 2, wherein the scan point is stored based on the value p being from a predetermined range of values.

4. The three-dimensional scanner device of claim 1, wherein the homogenization is performed based on a locally averaged surface point density ρ that is limited by $\rho_{max}$, which can be calculated as $$\rho_{max} = \frac{1}{R0^2 * \Delta\varphi * \Delta\theta},$$

where R0 is a normalization constant.

5. The three-dimensional scanner device of claim 1, wherein scan points are captured at a regular interval of θ for each φ in a capture cycle.

6. The three-dimensional scanner device of claim 5, wherein the capture cycle is one revolution of a mirror used by the three-dimensional scanner device.

7. A computer-implemented method for generating, by a three-dimensional (3D) scanner device, a point cloud representing multiple surfaces from an environment, the point cloud comprises a plurality of scan points, and the method comprising:
receiving spherical coordinates for a scan point, the spherical coordinates comprising a distance (r), a polar angle (θ), and an azimuth angle (φ);
homogenizing a scan point density of the surfaces by filtering the scan points, the homogenizing comprising:
computing a value (p) for the scan point based on the spherical coordinates, wherein the value is a pseudo-random number based on the spherical coordinates;
based on the value of the pseudo-random number exceeding a predetermined threshold, storing the scan point as part of the point cloud; and
based on the value of the pseudo-random number not exceeding the predetermined threshold, discarding the scan point.

8. The computer-implemented method of claim 7, wherein the pseudo-random number is generated based on the spherical coordinates as $p=(r/R0)^2 * \sin(\theta)$, where R0 is a normalization constant.

9. The computer-implemented method of claim 8, wherein the scan point is stored based on the value p being from a predetermined range of values.

10. The computer-implemented method of claim 7, wherein the homogenization is performed based on a locally averaged surface point density ρ that is limited by $\rho_{max}$, which can be calculated as $$\rho_{max} = \frac{1}{R0^2 * \Delta\varphi * \Delta\theta},$$

where R0 is a normalization constant.

11. The computer-implemented method of claim 7, wherein scan points are captured at a regular interval of θ for each φ in a capture cycle.

12. The computer-implemented method of claim 11, wherein the capture cycle is one revolution of a mirror used by the three-dimensional scanner device.

13. A computer program product comprising a memory storage device that has computer executable instructions stored therein, the computer executable instructions when executed by a processor cause the processor to perform a method comprising:
generating a point cloud representing multiple surfaces, the point cloud comprises a plurality of scan points, and wherein generating the point cloud comprises:
receiving spherical coordinates for a scan point, the spherical coordinates comprising a distance (r), a polar angle (θ), and an azimuth angle (φ);
homogenizing a scan point density of the surfaces by filtering the scan points, the homogenizing comprising:

computing a value (p) for the scan point based on the spherical coordinates, wherein the value is a pseudo-random number based on the spherical coordinates;

based on the value of the pseudo-random number exceeding a predetermined threshold, storing the scan point as part of the point cloud; and based on the value of the pseudo-random number not exceeding the predetermined threshold, discarding the scan point.

14. The computer program product of claim 13, wherein the pseudo-random number is generated based on the spherical coordinates as $p=(r/R0)^2 * \sin(\theta)$, where R0 is a normalization constant.

15. The computer program product of claim 14, wherein the scan point is stored based on the value p being from a predetermined range of values.

16. The computer program product of claim 14, wherein the homogenization is performed based on a locally averaged surface point density $\rho$ that is limited by $\rho_{max}$, which can be calculated as $$\rho_{max} = \frac{1}{R0^2 * \Delta\varphi * \Delta\theta},$$

where R0 is a normalization constant.

17. The computer program product of claim 13, wherein scan points are captured at a regular interval of $\theta$ for each $\varphi$ in a capture cycle, the capture cycle being one revolution of a mirror used by the three-dimensional scanner device.

* * * * *